United States Patent [19]

Oomura et al.

[11] Patent Number: 4,868,372

[45] Date of Patent: Sep. 19, 1989

[54] ERRONEOUS-OPERATION PREVENTIVE APPARATUS

[75] Inventors: Masatoshi Oomura; Takahiko Miyata, both of Seto; Kunio Fujisaki; Tsutomu Shirahase, both of Owariasahi, all of Japan

[73] Assignee: Hitachi, Ltd., Tokyo, Japan

[21] Appl. No.: 207,928

[22] Filed: Jun. 15, 1988

Related U.S. Application Data

[63] Continuation of Ser. No. 886,381, Jul. 17, 1986, abandoned.

[30] Foreign Application Priority Data

Dec. 23, 1985 [JP] Japan .................................. 60-287708

[51] Int. Cl.⁴ .............................................. G06K 5/00
[52] U.S. Cl. .................................................. 235/380
[58] Field of Search ............. 235/380, 381, 382, 382.5

[56] References Cited

U.S. PATENT DOCUMENTS

| | | | |
|---|---|---|---|
| 4,442,345 | 4/1984 | Mollier et al. | 235/380 |
| 4,471,216 | 9/1984 | Herve | 235/380 |
| 4,629,874 | 12/1986 | Pugsley et al. | 235/380 |

Primary Examiner—Envall, Jr. Roy N.
Attorney, Agent, or Firm—Antonelli, Terry & Wands

[57] ABSTRACT

An erroneous-operation preventive apparatus operable with an operation medium has a unit for receiving the operation medium. The unit includes first and second data modifiers and the operation medium stores first data, second data equal to the first data modified by the first data modifier, and third data equal to the first data modified by the second data modifier. When the operation medium is set in the unit, the first and second modifiers modify the first data from the operation medium. The modified first data is compared with the second and third data from the operation medium to decide the correctness of operation when the comparison results indicate a predetermined relationship between the modified first data with the respective second and third data.

3 Claims, 5 Drawing Sheets

ERRONEOUS-OPERATION PREVENTIVE APPARATUS

This is a continuation Application of Ser. No. 886,381, filed Jul. 17, 1986

BACKGROUND OF THE INVENTION

This invention relates to mal-operation preventive apparatus in a system for use with IC cards.

A basic construction of the IC card is disclosed in U.S. Pat. Nos. 4,102,493 and 4,092,524.

For example, as disclosed in the Publication JP-A-59-75380, an erroneous transaction preventive apparatus of this type has been known wherein an IC card collates and checks identification data from a unit for receiving the IC card with identification data in the IC card and a collation result is outputted to an external unit. In this known apparatus, therefore, the IC card detects an erroneous-operation of the external unit. Conversely, in order for an external unit to detect incorrectness or erroneous-operation of an IC card, the external unit reads identification data in the IC card and collates and checks it with identification data held in the external unit, as is effected in a system for use with conventional magnetic cards. Thus, in the latter apparatus, the IC card and the external unit each retain either of the two kinds of identification data to enable them to mutually check each other for correctness or erroneous-operation. In another known system for setting IC cards with different identification data, an external unit is required to retain all of the identification data.

Encountered in any of the conventional apparatus is a problem that the external unit using a memory for storage of all the identification data is costly and another problem that when the identification of the IC card is desired to be changed, the identification data stored in the external unit, requiring troublesome labor requirements especially where a plurality of external units are installed.

SUMMARY OF THE INVENTION

An object of this invention is to solve the aforementioned problems by realizing detection of erroneous operation of an IC card and of an external unit without storing identification data for collation in the external unit for receiving the IC card.

According to the present invention, the above object can be attained by an erroneous operation preventive apparatus operable with an operation medium, for example, an IC card, comprising an external unit adapted to receive the IC card and having a first identification data modifier and a second identification data modifier, and the IC card retaining identification data (P0), modified identification data (P1) obtained from the identification data through modification at the first identification data modifier and additional modified identification data (P2) also obtained from the identification data through modification at the second identification data modifier.

With this construction, the external unit fetches identification data (P0) and modified identification data (P1) from the IC card prior to delivery of transaction information between the external unit and IC card, so that the first identification data modifier may modify the identification data into modified identification data (P0') and this modified identification data (P0') may be compared and collated with the modified identification data (P1) to check the IC card for its correctness. Further, the second identification data modifier modifies the identification data into modified identification data (P0'') which in turn is fed to the IC card. In the IC card, this modified identification data (P0'') is compared and collated with modified identification data (P2) stored in the IC card to check the external unit for its correctness.

In this manner, erroneous operation of the IC card and that of the external unit can be detected without retaining identification data for different IC cards in the external unit.

Because it is not necessary for retainment of identification data for determining erroneous-operation of the IC card and external unit in the external unit, the apparatus of this invention does not require that an external unit have different identification codes corresponding to IC cards or that an area for storage of all the identification data be reserved in the external unit, thereby permitting highly simplified and efficient construction of the system.

DESCRIPTION OF THE PREFERRED EMBODIMENTS

Figure 1:
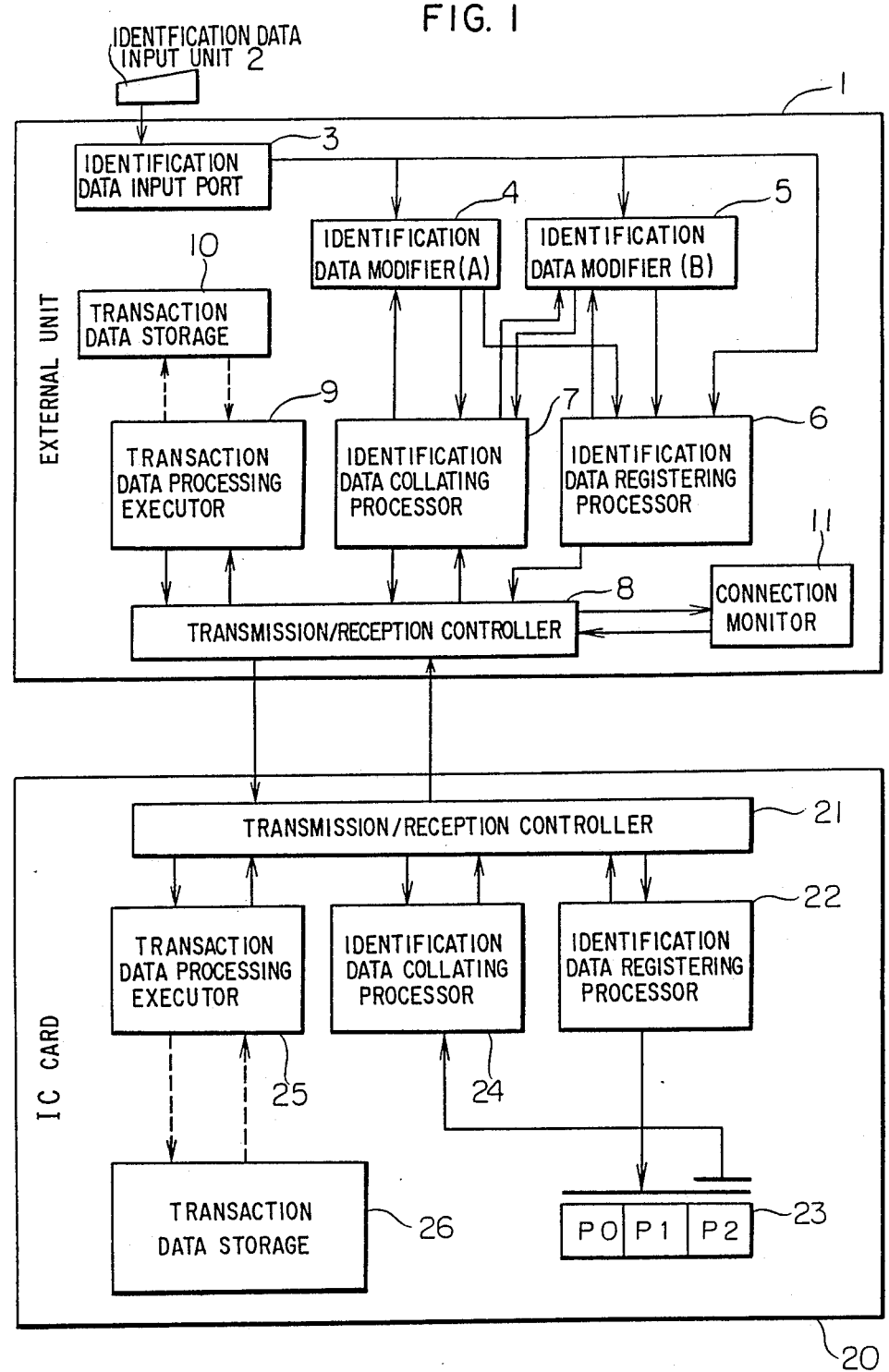
FIG. 1 is a block diagram showing an IC card and an external unit according to an embodiment of the invention.

An erroneous operation preventive apparatus operable with an IC card is employed in a terminal system and comprises an external unit and the IC card as schematically shown in the block diagram of FIG. 1.

The external unit 1 is connected with an identification data input unit 2.

The external unit 1 comprises an identification data input port 3 for receiving identification data supplied from the identification data input unit 2, an identification data modifier (A) as designated by reference numeral 4, an identification data modifier (B) as designated by reference numeral 5, an identification data registration processor 6 registering the identification data in the IC card 20, an identification data collation processor 7 for processing identification data sent from the IC card, a transaction data processing executor 9 for processing transaction data, a transaction data storage 10, an IC card connection monitor 11 for detecting connection of the IC card to the external unit, and a transmission/reception controller 8 for input/output processing of all the data in relation to the IC card and for distributing data to individual components in accordance with the contents of the data.

The IC card 20 comprises a transmission/reception controller 21 for input/output processing of all the data in relation to the external unit 1 and for distributing data to individual components in accordance with the contents of the data, an identification data registering processor 22 adapted to effect processings for storing of identification data sent from the external unit 1, an identification data storage 23 for storing the identification data, an identification data collating processor 24 adapted to effect processings for determining an identification data for collation sent from the external unit 1, a transaction data processing executor 25 for processing the transaction data, and a transaction data storage 26.

Figure 5:
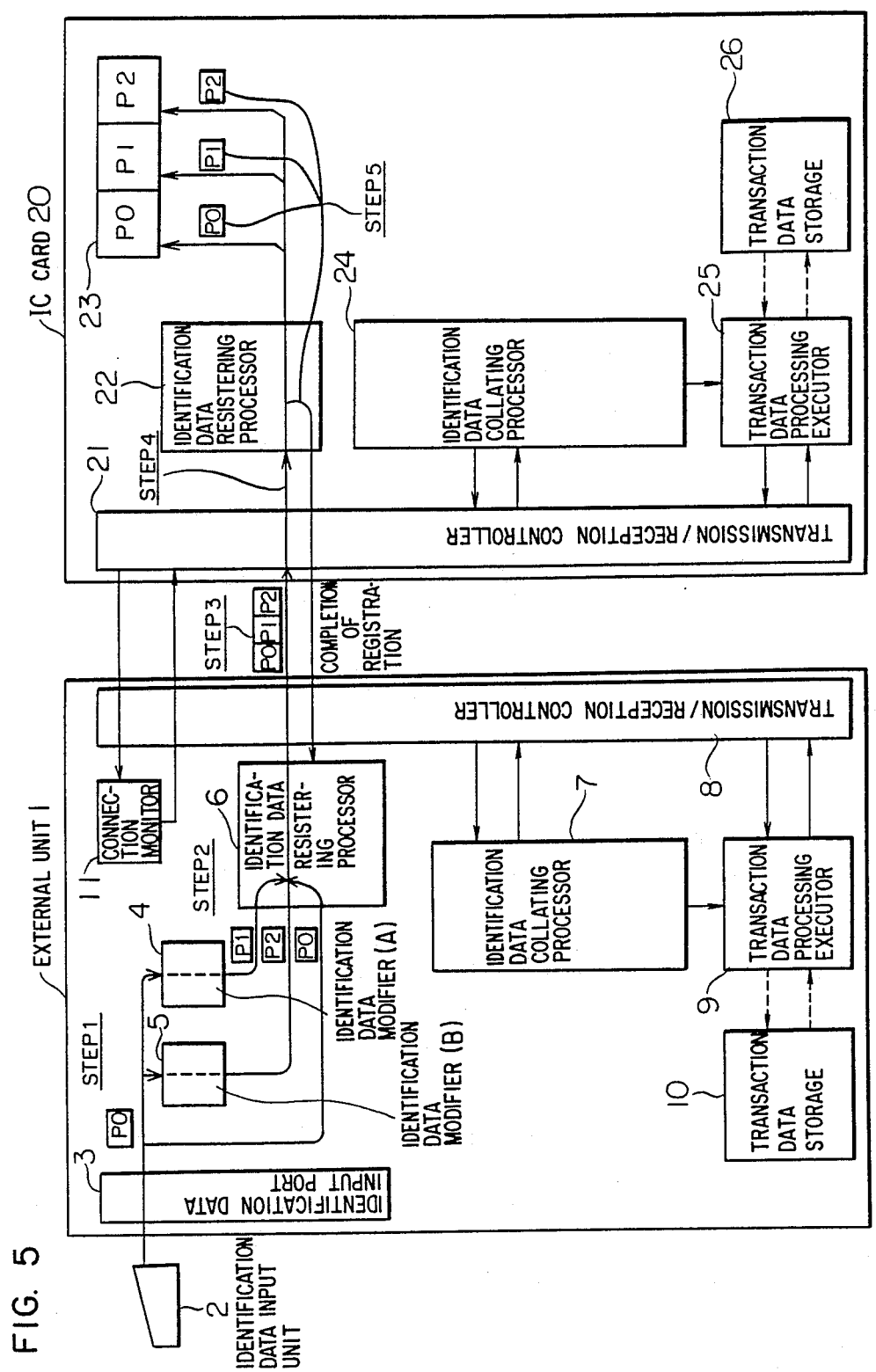
FIGS. 5 and 6 are diagrams useful in explaining the process sequence of the FIG. 1 embodiment.

Sequence of processings for storing the identification data in the IC card will first be described with reference to FIG. 5.

Step 1

Identification data (P0) inputted from the identification data input unit 2 is transferred by the identification data input port 3 to the identification data modifier (A) 4, identification data modifier (B) 5 and identification data registration processor 6.

Step 2

The identification data modifier (A) 4 and identification data modifier (B) 5 modify the transferred identification data (P0) into modified identification data (P1) and (P2), respectively, and send them to the identification data registering processor 6.

Step 3

After receiving all of the identification data (P0) and modified identification data (P1) and (P2), the identification data registering processor 6 transmits the identification data to the IC card through the transmission/reception controller 8.

Step 4

The transmission/reception controller 21 of IC card 20 receives the identification data and transfers them to the identification data registering processor 22.

Step 5

The identification data registering processor 22 sets the transferred identification data into the identification data storage 23 and thereafter informs the external unit 1 of completion of identification data registration through the transmission/reception controller 21, thus completing a registration process for registering the identification data (P0) and modified identification data (P1) and (P2) into the IC card.

Figure 6:
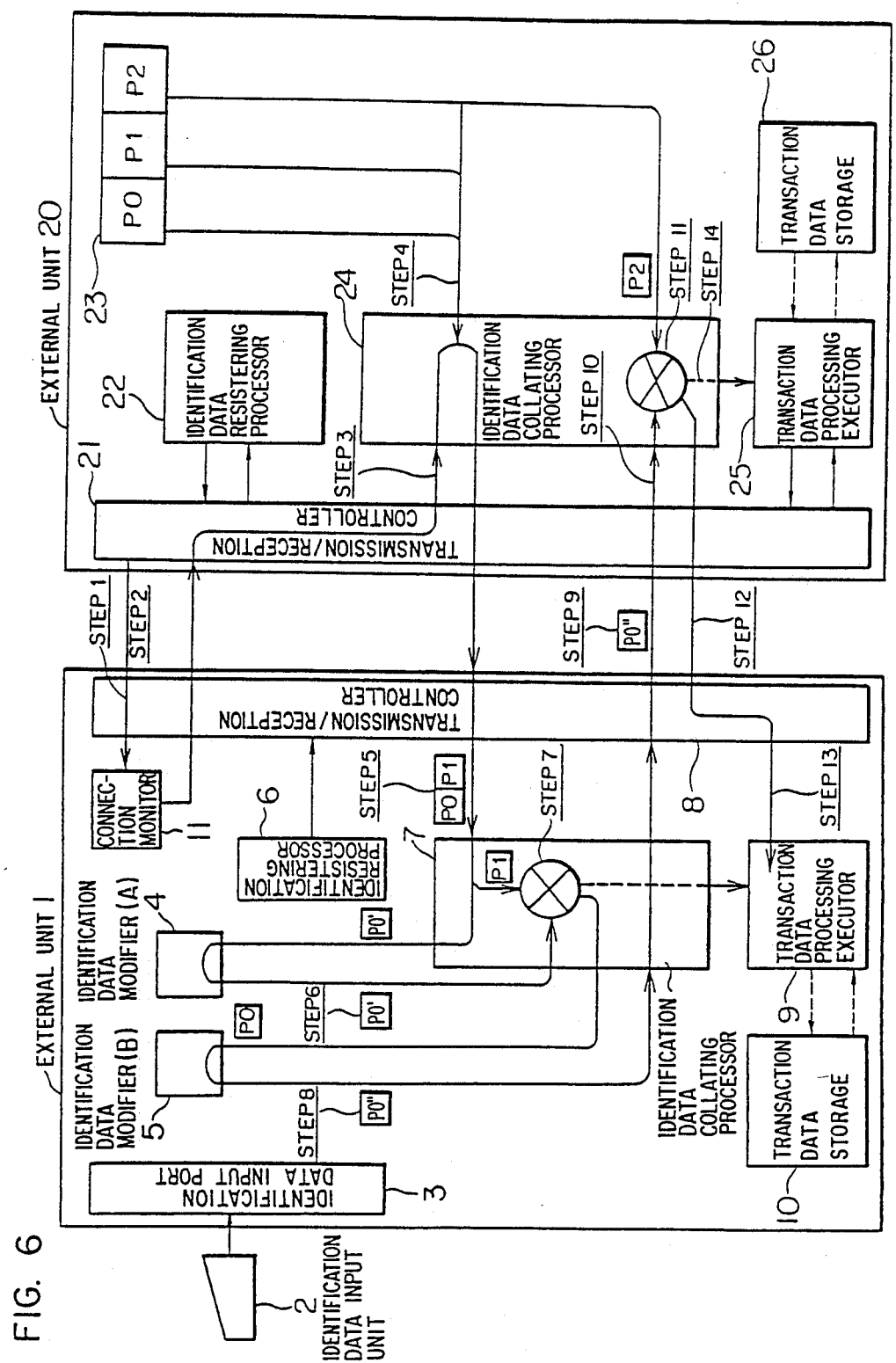

Next, sequence of processings executed for initiation of a transaction using the IC card will be described with reference to FIG. 6.

Step 1

When the IC card 20 is connected to the external unit 1, the transmission/reception controller 8 sends information to this effect to the IC card connection monitor 11.

Step 2

After receiving the above information, the IC card connection monitor 11 transmits a reset signal to the IC card 20 through the transmission/reception controller 8.

Step 3

After receiving the reset signal, the transmission/reception controller 21 of IC card 20 drives the identification data collating processor 24.

Step 4

The identification data collating processor 24, informed of "reset signal reception", fetches the identification data (P0) and modified identification data (P1) from the identification data storage 23 and transmits them to the external unit 1 through the transmission/reception controller 21.

Step 5

The transmission/reception controller 8 of external unit 1 transfers the received identification data (P0) and modified identification data (P1) to the identification data collating processor 7.

Step 6

The identification data collating processor 7 sends the received identification data (P0) to the identification data modifier (A) 4 at which the data (P0) is modified to produce a modified identification data (P0').

Step 7

The identification data collating processor 7 compares and collates this modified identification data (P0') with the modified identification data (P1) which has been received from the IC card 20.

Step 8

If the modified identification data (P0') is coincident with the modified identification data (P1), the connected IC card 20 is determined to be correct. The identification data collating processor 7 then drives the identification data modifier (B) 5 so that the identification data is modified into the modified identification data (P0''). If not coincident, the identification data collating processor 7 informs the transaction data processing executor 9 of "invalidity of transaction (NG)".

Step 9

When coincidence of the modified identification data is obtained, the identification data collating processor 7 transmits the modified identification data (P0'') to the IC card 20 through the transmission/reception controller 8 and at the same time informs the transaction data processing executor 9 of "validity of transaction (OK)".

Step 10

The transmission/reception controller 21 of IC card 20 transfers the received modified identification data (P0'') to the identification data collating processor 24.

Step 11

The identification data collating processor 24 compares and collates the thus transferred modified identification data (P0'') with the modified identification data (P2) in the identification data storage 23.

Step 12

If the modified identification data (P0'') is coincident with the modified identification data (P2), the connected external unit 1 is determined to be correct. The identification data collating processor 24 then informs the external unit 1 of "coincidence of collation (OK)" through the transmission/reception controller 21 and at the same time, informs the transaction data processing executor 25 of "validity of transaction (OK)". If not coincident, the identification data collating processor 24 informs the external unit 1 of "non-coincidence of collation (NG)" and concurrently, informs the transaction data processing executor 25 of "invalidity of transaction (NG)".

Step 13

The transaction data processing executor 9 of external unit 1 does not perform transmission/reception operations of the contents of the transaction data storage 10 until it receives the information concerning the "validity of transaction (OK)" from the identification data collating processor 7 and the information about "coincidence of collation (OK)" sent from the IC card 20 through the transmission/reception controller 8.

Step 14

The transaction data processing executor 25 of IC card 20 does not perform transmission/reception operations of the contents of the transaction data storage 26 until it receives the information concerning the "validity of transaction (OK)" from the identification data collating processor 24.

Thus, the process for checking the IC card and external unit for their correctness is complete.

Figure 2:
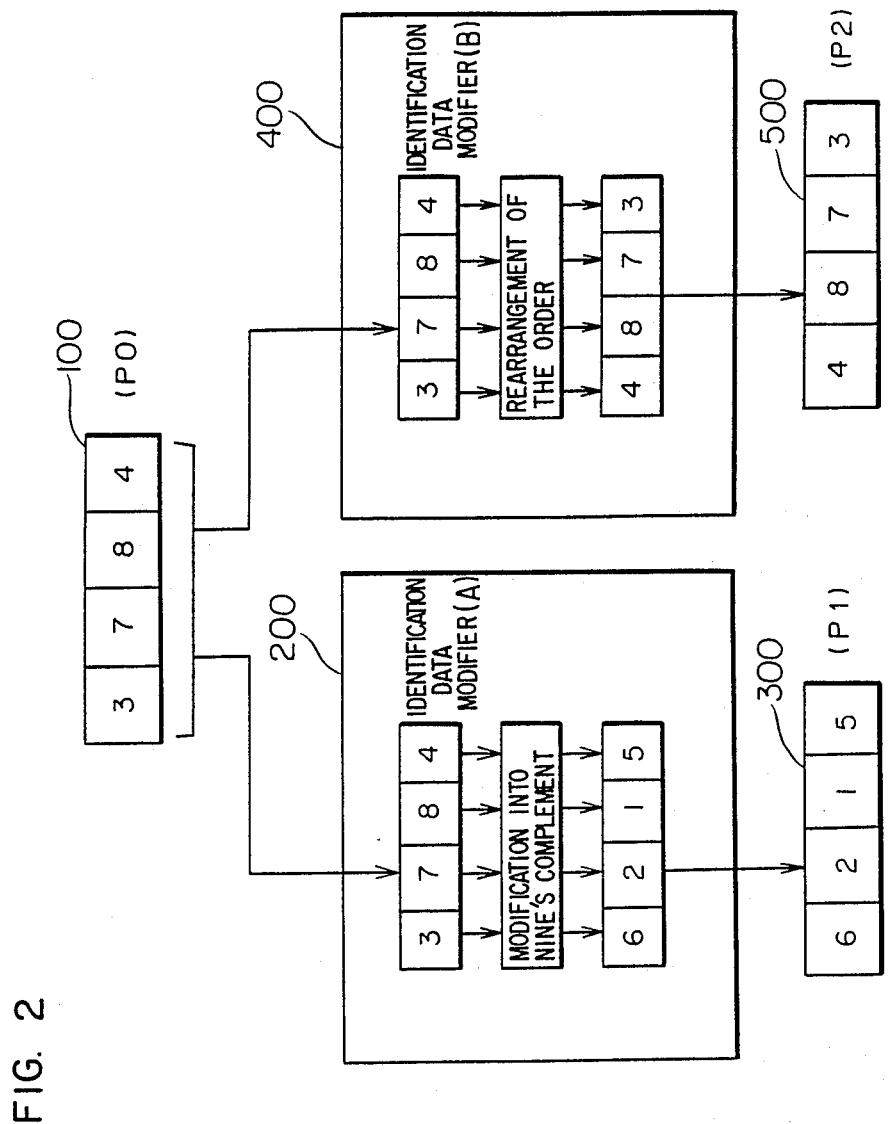
FIGS. 2 and 3 are diagrams showing examples of identification data modification in the FIG. 1 embodiment.
Figure 3:
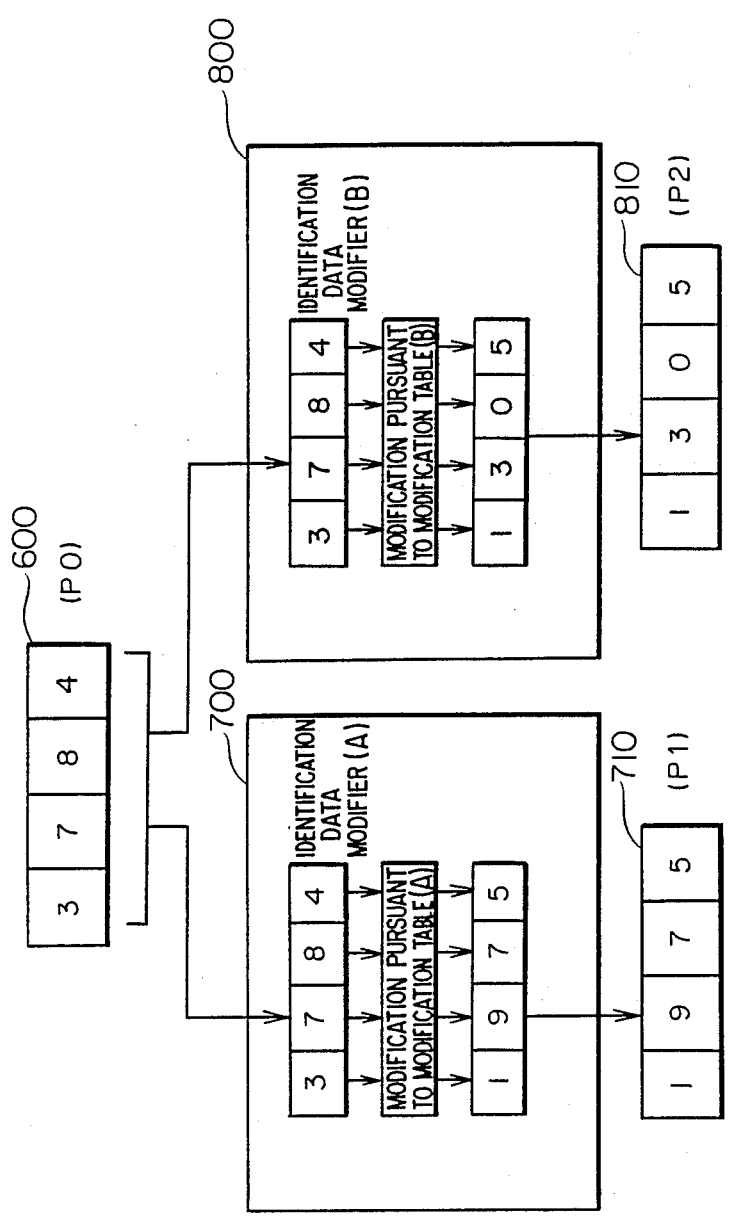

FIGS. 2 and 3 illustrate examples of processings executed in the identification data modifiers (A) and (B).

An example of FIG. 2 will first be explained.

(1) Identification data (P0) 100 is assumed to be a four-digit number, for example, "3784" as illustrated.

(2) In an identification data modifier (A) 200, the nine's complement is calculated for each digit of the identification data (P0) 100.

Results are as follows:

(a) 3 ... 9−3=6

(b) 7 ... 9−7=2

(c) 8 ... 9−8=1

(d) 4 ... 9−4=5

(3) Thus, after modification, "6215" indicated as the modified identification data (P1) 300 is obtained.

(4) In an identification data modifier (B) 400, the order of digits of the identification data (P0) 100 is reversed to modify "3784" into "4873".

(5) Thus, after modification, "4873" indicated as the modified identification data (P2) 500 is obtained.

Another example will now be described.

(1) Identification data (P0) 600 is assumed to be the same numerical data as that of the FIG. 2 example.

Figure 4:
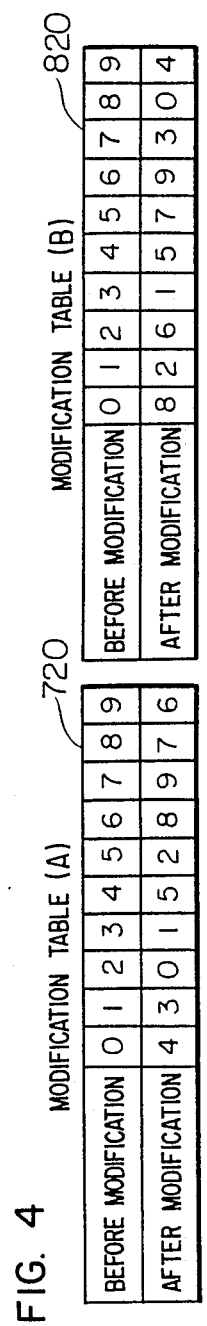
FIG. 4 shows modification tables used in the example of FIG. 3.

(2) In an identification data modifier (A) 700, each digit of the identification data (P0) 600 is modified by referring to a modification table (A) 700 as shown in Fig. 4.

Results are as follows:

(a) 3 →1

(b) 7 →9

(c) 8 →7

(d) 9 →5

(3) Thus, after modification, "1975" indicated as the modified identification data (P1) 710 is obtained.

(4) In an identification data modifier (B) 800, each digit of the identification data (P0) 600 is modified by referring to a modification table (B) 820.

Results are as follows:

(a) 3 →1

(b) 7 →3

(c) 8 →0

(d) 4 →5

(5) Thus, after modification, "1305" indicated as the modified identification data (P2) 810 is obtained.

As far as the example of FIG. 2 is concerned, a correct external unit must have the identification data modifier (A) 200 and the identification data modifier (B) 400, and a correct IC card must be registered with the identification data and modified identification data (P0, P1, P2) by means of the correct external unit.

For example, if an IC card holding incorrect identification data P0=1000 and modified identification data P1=2000 and P3=3000 transmits the P0 and P1 to the correct external unit in response to the reset signal therefrom, then the identification data modifier (A) 200 of the correct external unit will modify the P0 into P0'=8999 and consequently, the P1 does not coincide with the P0', thus enabling detection of erroneous-operation or incorrectness of the IC card.

Conversely, if a correct IC card transmits the identification data P0=3784 and modified identification data P1=6215 to an incorrect external unit in response to a reset signal therefrom, then the incorrect external unit fails to produce P0'=4873 from P0=3784, thus enabling the IC card to detect incorrectness of the external unit.

In the example of FIG. 3, even if the identification data (P0) is kept intact, the contents of the modified indication data (P1) and (P2) can be changed by changing the contents of the modification tables (A) 720 and (B) 820 from one external unit to another. Thereby permitting a transaction only to the external unit wherein predetermined mutual relations between the indication data P0, P1 and P2 are satisfied.

This readily permits preparation of an IC card which limits the external.

We claim:

1. An erroneous-operation preventive apparatus operable with an operation medium comprising:
   a unit for receiving said operation medium and including first and second data modifiers, said operation medium storing first data, second data equivalent to said first data modified by said first data modifier and third data equivalent to said first data modified by said second data modifier;
   means for causing said first and second modifiers to modify said first data from said operation medium when said operation medium is set in said unit; and
   means for comparing the modified first data with said second and third data from said operation medium and determining correctness of operation when the comparison results indicate a predetermined relationship of said modified first data with said respective second and third data.

2. An erroneous-operation preventive apparatus operable with an operation medium when inserted into said apparatus, comprising:
   accepting means for accepting said operation medium for transmitting data between said operation medium and said apparatus, said operation medium having a determining means and first, second and third memory means;

first modify means for modifying first data from said first memory means to generate first modification data in a predetermined manner;

comparing means for comparing second data from said second memory with said first modification data to determine whether a predetermined relation exists therebetween; and second modify means for modifying said first data from said first memory means to generate second modification data and for returning said second modification data for use by said operation medium.

3. A method of preventing erroneous-operation of a unit of receiving an operation medium, comprising the steps of:

transferring first identification data from said operation medium to a first modifier and a second modifier contained in said unit;

modifying said first identification data into first modified identification data in said first modifier;

modifying said first identification data into second modified identification data in said second modifier;

transmitting said first identification data, said first modified identification data and said second modified identification data back to said operation medium;

transmitting said first identification data and said first modified identification data back to said unit;

modifying said first identification data into third modified identification data;

comparing said third modified identification data with said first modified identification data in said unit to determine if said first and third modified identification are coincident;

modifying said first identification data into fourth modified identification data if said first and third modified identification data are coincident;

transmitting said fourth modified identification data to said operation medium;

comparing said fourth modified identification data with said second modified identification data in said operation medium to determine if said second and fourth modified identification data are coincident; and wherein when said first and third modified identification data are coincident, said operation medium is correct and when said second and fourth modified identification data are coincident said unit is correct.

* * * * *